(12) United States Patent
Kida et al.

(10) Patent No.: US 9,688,274 B2
(45) Date of Patent: Jun. 27, 2017

(54) DRIVING ASSISTANCE APPARATUS

(71) Applicant: TOYOTA JIDOSHA KABUSHIKI KAISHA, Toyota-shi, Aichi-ken (JP)

(72) Inventors: Akihiro Kida, Toyota (JP); Motonari Ohbayashi, Nagakute (JP)

(73) Assignee: TOYOTA JIDOSHA KABUSHIKI KAISHI, Toyota (JP)

( * ) Notice: Subject to any disclaimer, the term of this patent is extended or adjusted under 35 U.S.C. 154(b) by 0 days.

(21) Appl. No.: 14/913,765

(22) PCT Filed: Aug. 26, 2014

(86) PCT No.: PCT/IB2014/001614
§ 371 (c)(1),
(2) Date: Feb. 23, 2016

(87) PCT Pub. No.: WO2015/028864
PCT Pub. Date: Mar. 5, 2015

(65) Prior Publication Data
US 2016/0214604 A1 Jul. 28, 2016

(30) Foreign Application Priority Data
Aug. 30, 2013 (JP) ................................ 2013-180505

(51) Int. Cl.
*B60W 30/08* (2012.01)
*B60W 30/085* (2012.01)
(Continued)

(52) U.S. Cl.
CPC ............ *B60W 30/085* (2013.01); *B60T 7/22* (2013.01); *B60W 10/06* (2013.01);
(Continued)

(58) Field of Classification Search
CPC ................................ G08G 1/16; G06F 19/00
See application file for complete search history.

(56) References Cited

U.S. PATENT DOCUMENTS

| 6,993,425 B2 * | 1/2006 | Tange | B60K 31/0008 340/435 |
| 7,155,341 B2 * | 12/2006 | Kimura | G08G 1/163 701/301 |

(Continued)

FOREIGN PATENT DOCUMENTS

| JP | H05-272370 A | 10/1993 |
| JP | 2005-254857 A | 9/2005 |

(Continued)

*Primary Examiner* — Adam Tissot
*Assistant Examiner* — Alex C Dunn
(74) *Attorney, Agent, or Firm* — Oliff PLC (57) ABSTRACT

A driving assistance apparatus includes: an obstacle detecting unit configured to detect an obstacle outside a host vehicle and acquire obstacle information including a distance to the obstacle; a collision avoidance control unit configured to execute driving force suppression control for intervening to suppress driving force on the basis of the obstacle information acquired by the obstacle detecting unit; and a driving force return control unit configured to execute driving force return control for returning the driving force suppressed by the driving force suppression control, have a plurality of return modes in which the driving force is returned by the driving force return control, and return the driving force in one return mode selected from among the plurality of return modes on the basis of a possibility that there is an obstacle around the host vehicle.

12 Claims, 6 Drawing Sheets

(51) Int. Cl.
*B60W 50/10* (2012.01)
*B60W 10/06* (2006.01)
*B60W 10/184* (2012.01)
*B60W 30/09* (2012.01)
*B60W 30/095* (2012.01)
*B60T 7/22* (2006.01)
*B60W 50/02* (2012.01)

(52) U.S. Cl.
CPC .......... *B60W 10/184* (2013.01); *B60W 30/09* (2013.01); *B60W 30/0956* (2013.01); *B60W 50/10* (2013.01); *B60W 2050/0215* (2013.01); *B60W 2520/04* (2013.01); *B60W 2520/10* (2013.01); *B60W 2540/10* (2013.01); *B60W 2550/10* (2013.01); *B60W 2710/0666* (2013.01); *B60W 2710/182* (2013.01)

(56) References Cited

U.S. PATENT DOCUMENTS

| | | | | |
|---|---|---|---|---|
| 7,734,419 | B2* | 6/2010 | Kondoh | B60K 26/021 340/435 |
| 7,739,022 | B2* | 6/2010 | Kobayashi | B60T 7/22 180/282 |
| 8,126,609 | B2* | 2/2012 | Kimura | B60K 26/021 701/29.2 |
| 8,442,739 | B2* | 5/2013 | Kuge | B60W 10/06 180/170 |
| 8,548,709 | B2* | 10/2013 | Morita | B60T 7/22 123/349 |
| 8,554,436 | B2* | 10/2013 | Kobayashi | B60W 50/16 701/300 |
| 2010/0023226 | A1* | 1/2010 | Ito | B60R 21/0134 701/46 |
| 2012/0235853 | A1* | 9/2012 | Takeuchi | B60W 30/09 342/71 |
| 2014/0025267 | A1* | 1/2014 | Tezuka | G08G 1/16 701/51 |

FOREIGN PATENT DOCUMENTS

| | | |
|---|---|---|
| JP | 2011-122607 A | 6/2011 |
| JP | 2012-061932 A | 3/2012 |

* cited by examiner

FIG. 4C

DRIVING ASSISTANCE APPARATUS

BACKGROUND OF THE INVENTION

1. Field of the Invention

The invention relates to a driving assistance technique.

2. Description of Related Art

There is known a driving assistance apparatus that detects an obstacle around a host vehicle by obstacle detecting means, and the like (for example, an ultrasonic sensor or a millimeter wave radar) and that avoids a collision with the obstacle. The driving assistance apparatus mostly avoids a collision with an obstacle by executing interventional control for suppressing driving force of the host vehicle or generating braking force (see Japanese Patent Application Publication No. 2011-122607 (JP 2011-122607 A) and Japanese Patent Application Publication No. 2012-061932 (JP 2012-061932 A)).

After a collision with an obstacle is avoided by the driving assistance apparatus, for example, if the driving force suppressed by interventional control is returned, a limitation may be placed on a manner of returning the driving force in terms of safety because there is a high possibility that the obstacle is still present around the host vehicle (see JP 2011-122607 A and JP 2012-061932 A).

For example, a vehicle control system described in JP 2011-122607 A cancels driving force suppression control when a vehicle speed is higher than or equal to a predetermined value. A collision avoidance system described in JP 2012-061932 A causes an engine driving force not to increase beyond a preset limit driving force when the collision avoidance system determines that a collision with an obstacle has been avoided.

Incidentally, there is a case where snow, or the like, adheres to obstacle detecting means, such as an ultrasonic sensor, the obstacle detecting means erroneously detects the adhesion matter as an obstacle, and driving assistance is started for avoiding a collision. In this case, there is no obstacle around the host vehicle and driving assistance for avoiding a collision is not required, so driving assistance for avoiding a collision is cancelled, and, for example, it is required to reduce a feeling of strangeness experienced by a driver by early returning the driving force suppressed through interventional control.

However, in the case of a return of the driving force after the adhesion matter to the obstacle detecting means has been erroneously detected as the obstacle, if a limitation is placed as described in JP 2011-122607 A or JP 2012-061932 A, a desired acceleration is not obtained although there is no obstacle around the host vehicle, so the driver may experience a feeling of strangeness or a discomfort.

SUMMARY OF THE INVENTION

The invention provides a driving assistance apparatus that, when an obstacle has been detected and a driving force has been suppressed through driving assistance for avoiding a collision, is able to return the suppressed driving force in a manner reflecting a driver's intention while ensuring safety.

A first aspect of the invention provides a driving assistance apparatus. The driving assistance apparatus includes: an obstacle detecting unit configured to detect an obstacle outside a host vehicle and acquire obstacle information including a distance to the obstacle; a collision avoidance control unit configured to execute driving force suppression control for intervening to suppress driving force on the basis of the obstacle information acquired by the obstacle detecting unit; and a driving force return control unit configured to execute driving force return control for returning the driving force suppressed by the driving force suppression control, have a plurality of return modes in which the driving force is returned by the driving force return control, and return the driving force in one return mode selected from among the plurality of return modes on the basis of a possibility that there is an obstacle around the host vehicle.

A second aspect of the invention provides a driving assistance apparatus. The driving assistance apparatus includes: an obstacle detecting unit configured to detect an obstacle outside a host vehicle and acquire obstacle information including a distance to the obstacle; a collision avoidance control unit configured to execute driving force suppression control for suppressing driving force on the basis of the obstacle information acquired by the obstacle detecting unit; and a driving force return control unit configured to execute driving force return control for returning the driving force suppressed by the driving force suppression control, and return the driving force by adjusting a rate of increase in the driving force on the basis of a possibility that there is an obstacle around the host vehicle.

According to the above aspects, it is possible to provide a driving assistance apparatus that, when an obstacle has been detected and driving force has been suppressed through driving assistance for avoiding a collision, is able to return the suppressed driving force in a manner reflecting driver's intention while ensuring safety.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, embodiments of the invention will be described with reference to the accompanying drawings.

First Embodiment

Figure 1:
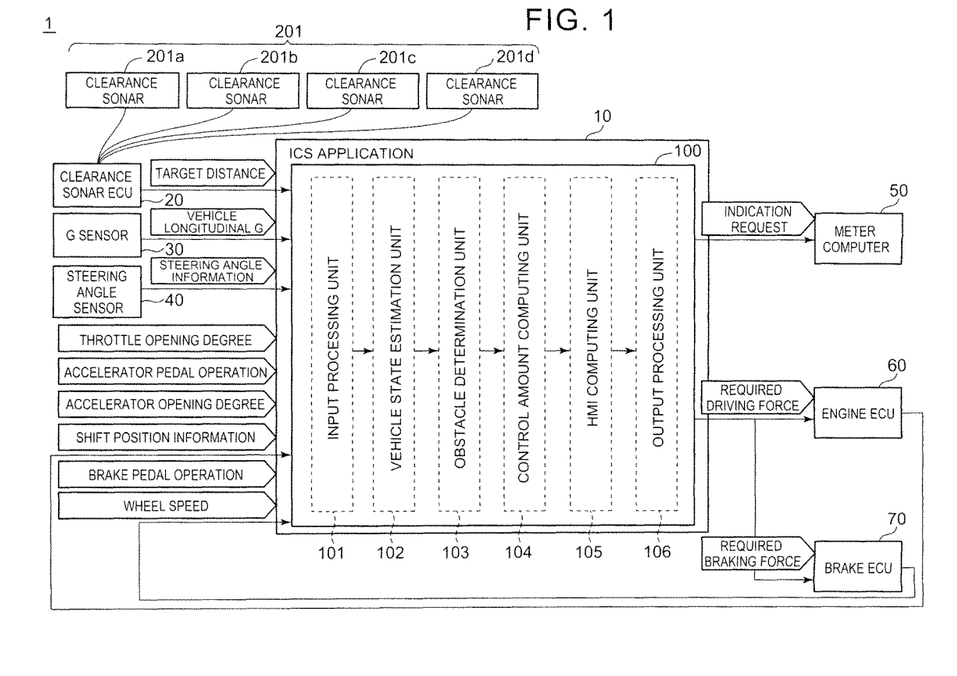
FIG. 1 is a block diagram that shows an example of a system configuration including a driving assistance apparatus.

FIG. 1 is a block diagram that shows an example of a system configuration including a driving assistance apparatus 1 according to the present embodiment.

As shown in FIG. 1, the driving assistance apparatus 1 includes a driving assistance ECU 10.

The driving assistance ECU 10 is formed of a microcomputer, and includes, for example, a ROM, a readable/rewritable RAM, a timer, a counter, an input interface, an output interface, and the like. The ROM stores control programs. The RAM stores computed results, and the like. The function of the driving assistance ECU 10 may be implemented by any one of hardware, software and firmware or a combination of any two or more of them. For example, selected part or all of the function of the driving assistance ECU 10 may be implemented by an application-specific integrated circuit (ASIC) or a field programmable gate array (FPGA). Part or all of the function of the driving assistance ECU 10 may be implemented by another ECU (for example, a clearance sonar ECU 20). The driving assistance ECU 10 may be configured to implement part or all of the function of another ECU (for example, the clearance sonar ECU 20).

The clearance sonar ECU 20, clearance sonars 201a, 201b, 201c, 201d, a G sensor 30, a steering angle sensor 40, a meter computer 50, an engine ECU 60, a brake ECU 70, and the like, may be connected to the driving assistance ECU 10. For example, the driving assistance ECU 10 may be communicably connected to the clearance sonar ECU 20, the G sensor 30, the steering angle sensor 40, the meter computer 50, the engine ECU 60 and the brake ECU 70 via an in-vehicle LAN, such as a controller area network (CAN), direct wires, or the like.

Each of the clearance sonars 201a, 201b, 201c, 201d is an ultrasonic sensor, and is provided at an appropriate location of a vehicle body. Each of the clearance sonars 201a, 201b, 201c, 201d is an example of a sensor that detects the presence or absence of an obstacle, having a relatively close detection distance of, for example, several centimeters to several meters, or a distance to the obstacle. For example, the two clearance sonars 201a, 201b may be provided at a front bumper, and the two clearance sonars 201c, 201d may be provided at a rear bumper. The number and arrangement of the sensors are not limited to these configurations. For example, sensors may be provided such that four sensors are provided at the front, four sensors are provided at the rear and two sensors are further provided at the sides. Each of the clearance sonars 201a to 201d outputs a detected result (obstacle information) within a corresponding one of detection ranges to the clearance sonar ECU 20.

Each of the clearance sonars 201a, 201b, 201c, 201d may be configured to operate when a vehicle speed falls within a low-speed range higher than 0. The clearance sonars 201a, 201b for detecting an obstacle ahead of the vehicle may be configured to operate at the time when the vehicle travels in accordance with a forward drive range (for example, D range). The clearance sonars 201c, 201d for detecting an obstacle behind may be configured to operate at the time when the vehicle travels in accordance with a reverse range (at the time when the vehicle travels backward). Each of the clearance sonars 201a, 201b, 201c, 201d may be configured to execute ultrasonic wave transmission/reception process at each predetermined interval. The predetermined interval may be set on the basis of a detection distance. For example, the predetermined interval extends when the detection distance is increased, whereas the predetermined interval shortens when the detection distance is reduced.

The clearance sonar ECU 20 processes the detected result input from each of the clearance sonars 201a to 201d, and calculates a "target distance" that is a distance to an obstacle. The clearance sonar ECU 20 transmits information about the calculated target distance (distance information) to the driving assistance ECU 10. For example, the clearance sonar ECU 20 may measure a distance to an obstacle by measuring a time that is taken for an ultrasonic wave irradiated from any one of the clearance sonars to reflect from the obstacle and return to the any one of the clearance sonars as the reflected wave. When the detection angle of each clearance sonar is a wide range of, for example, 90°, the direction of an obstacle is not identified only on the basis of the detected result from a single clearance sonar. In this case, for example, the clearance sonar ECU 20 may identify the location (direction) of an obstacle by obtaining distances from the plurality of clearance sonars to the obstacle. The clearance sonar ECU 20 may determine the shape of an obstacle (for example, a shape like a wall or a shape like a utility pole).

The G sensor 30 measures the longitudinal acceleration of the vehicle, and transmits the measured result to the driving assistance ECU 10 as information about "vehicle longitudinal G". The longitudinal acceleration of the vehicle, which is measured by the G sensor 30, is a resultant value of an acceleration that is calculated from a wheel speed and an acceleration of gravity due to the gradient of a road (the inclination of the vehicle). Thus, it is possible to measure the gradient of a road by subtracting an acceleration, which is calculated from a wheel speed, from the vehicle longitudinal G that is measured by the G sensor 30.

The steering angle sensor 40 detects the steering angle of a steering wheel, and transmits the steering angle to the driving assistance ECU 10 as steering angle information.

A combination meter instrument (not shown) that informs a driver by indication, an information sound generating device (not shown) that informs the driver by voice, or the like, is connected to the meter computer 50. The meter computer 50 controls numeric values, characters, graphics, indicator lamps, and the like, that are displayed on the combination meter instrument in response to a request from the driving assistance ECU 10, and controls alarm sound or alarm voice that is issued from the information sound generating device.

The engine ECU 60 is to control the operation of an engine that is a driving source for the vehicle, and controls, for example, ignition timing, fuel injection amount, throttle opening degree, and the like. The engine ECU 60 controls engine output on the basis of a required driving force from the driving assistance ECU 10 (described later). In the case of a hybrid vehicle, the engine ECU 60 may control (suppress) driving force in response to the required driving force from the driving assistance ECU 10 in cooperation with an HVECU (not shown) that controls an overall hybrid system. In the case of a hybrid vehicle or an electric vehicle, motor output may be controlled on the basis of a required driving force from the driving assistance ECU 10.

The engine ECU 60 may transmit information about accelerator pedal operation, information about accelerator opening degree, information about throttle valve opening degree and shift position information may be transmitted to the driving assistance ECU 10. The information about accelerator pedal operation indicates the operation amount of the accelerator pedal (not shown). The information about accelerator opening degree indicates the accelerator opening degree. The information about throttle valve opening degree indicates the throttle opening degree. The shift position information indicates the position of a shift lever, and is P (parking), R (reverse), N (neutral), D (drive), or the like. The shift position information may include, for example, a drive mode, such as a sporty mode and a snow mode, a status of use of adaptive cruise control (ACC), or the like. The information about accelerator pedal operation may be directly acquired from an accelerator position sensor. The information about throttle valve opening degree may be directly acquired from a throttle sensor provided in a throttle body. The shift position information may be acquired from an ECU that controls a transmission or may be directly acquired from a shift position sensor.

The brake ECU 70 is to control a braking system of the vehicle, and controls, for example, a brake actuator that actuates a hydraulic brake device arranged in each wheel (not shown). The brake ECU 70 controls the output of the brake actuator (wheel cylinder pressure) on the basis of a required braking force from the driving assistance ECU 10 (described later). The brake actuator may include a pump that generates a high-pressure oil (and a motor that drives the pump), various valves, and the like. Any hydraulic circuit configuration of the braking system may be employed. The hydraulic circuit of the braking system just needs to be configured to be able to increase each wheel cylinder pressure irrespective of the driver's depression amount of the brake pedal. Typically, the hydraulic circuit may include a high-pressure hydraulic source (a pump or an accumulator that generates high-pressure oil) other than a master cylinder. A circuit configuration that is typically used in a brake-by-wire system that is represented by an electric control brake system (ECB) may be employed. In the case of a hybrid vehicle or an electric vehicle, motor output (regenerative operation) may be controlled on the basis of a required braking force from the driving assistance ECU 10.

The brake ECU 70 may transmit information about brake pedal operation and information about wheel speed to the driving assistance ECU 10. The information about wheel speed may be, for example, based on a signal from a wheel speed sensor provided at each wheel (not shown). The speed or acceleration (or deceleration) of the vehicle (vehicle body speed) is allowed to be calculated from the information about wheel speed. The information about brake pedal operation may be directly acquired from a brake depression force switch or a master cylinder pressure sensor. Similarly, the information about wheel speed (or information about vehicle speed) may be directly acquired from a wheel speed sensor, a drive shaft rotation sensor, or the like.

The driving assistance ECU 10 includes an intelligent clearance sonar (ICS) application 100. In the example shown in FIG. 1, the ICS application 100 is software that runs in the driving assistance ECU 10, and includes an input processing unit 101, a vehicle state estimation unit 102, an obstacle determination unit 103, a control amount computing unit 104, a human machine interface (HMI) computing unit 105 and an output processing unit 106.

The driving assistance ECU 10 (collision avoidance control unit, driving force return control unit, adhesion matter determination unit) carries out driving assistance such that the host vehicle does not collide with an obstacle on the basis of, for example, information from the clearance sonar ECU 20. The driving assistance may include an alarm that prompts driver's autonomous brake operation (in cooperation with the meter computer 50), intervening to suppress driving force (in cooperation with the engine ECU 60) and intervening to generate braking force (in cooperation with the brake ECU 70). Intervening to suppress driving force and intervening to generate braking force may be, for example, started at the timing at which an obstacle has been detected. Intervening to suppress driving force may be started at the timing at which an obstacle has been detected, and intervening to generate braking force may be started at the timing at which it has been determined there is a high possibility of a collision with the obstacle.

The driving assistance ECU 10 carries out driving assistance for returning (hereinafter, which may be referred to as return driving assistance) from a state where driving assistance for avoiding a collision (hereinafter, which may be referred to as collision avoidance driving assistance) is carried out after the collision avoidance driving assistance is carried out. The return driving, assistance may include, for example, cancelling generated interventional braking force and returning suppressed driving force to a predetermined level (driving force return control). The details of the return driving assistance (driving force return control) according to the present embodiment will be described later.

The input processing unit 101 executes the process of inputting various pieces of information, which are received by the driving assistance ECU 10. For example, information that is received in conformity with the CAN communication standard is converted to information that is usable in the ICS application 100. The distance information from the clearance sonar ECU 20, the information about the vehicle longitudinal G from the G sensor 30, and the steering angle information from the steering angle sensor 40 are input from the input processing unit 101 The information about accelerator pedal operation, the information about accelerator opening degree, the information about throttle valve opening degree and the shift position information are input from the engine ECU 60 to the input processing unit 101. The information about brake pedal operation and the information about wheel speed are input from the brake ECU 70.

The vehicle state estimation unit 102 includes the function of estimating a vehicle state on the basis of the above-described various pieces of information, input to the input processing unit 101. For example, the vehicle state estimation unit 102 may determine whether a vehicle state in which the clearance sonars 201a to 201d should operate has been established.

The obstacle determination unit 103 carries out collision determination on an obstacle detected by the clearance sonars 201a to 201d on the basis of, for example, obstacle information associated with the obstacle. Specifically, the obstacle determination unit 103 determines whether there is a high possibility of a collision of the detected obstacle with the host vehicle. For example, the obstacle determination unit 103 may determine that the host vehicle collides with the obstacle when a distance to the obstacle is shorter than a predetermined distance, a deceleration required to avoid a collision with the obstacle (required deceleration) is higher than a predetermined threshold TH and the obstacle is located in a range in which the obstacle is unavoidable through steering operation. The determination may be carried out on the basis of obstacle information regarding the obstacle, which is detected by the clearance sonars 201a to 201d, steering information received from the steering angle sensor 40, wheel speed information received from the brake ECU 70, and the like.

The obstacle determination unit 103 returns the host vehicle from a state where driving assistance for avoiding a collision with an obstacle has been carried out. Specifically, when driving assistance for avoiding a collision with an obstacle has been carried out and, after that collision avoidance driving assistance is completed because, for example, the obstacle is not detected anymore, the host vehicle is returned from the state where the collision avoidance driving assistance has been carried out. For example, when interventional driving force suppression has been carried out, the obstacle determination unit 103 may return the suppressed driving force to the predetermined level. In the present embodiment, at the time of returning the suppressed driving force, the obstacle determination unit 103 selects one return mode from among a plurality of return modes on the basis of a possibility that there is an obstacle around the host vehicle. The control amount computing unit 104 (described later) computes a required driving force in accordance with the selected return mode, and returns the driving force in accordance with the selected return mode. Each return mode is defined as a temporal change in driving force for an accelerator opening degree, and is set such that a level to which the driving force is returned, a time taken until completion of the return, a rate of increase at the time of the return, or the like, is different. That is, the return modes are set such that a driving force corresponding to a certain accelerator opening degree is different among the return modes. A specific method of returning driving force and the details of each return mode will be described later.

The obstacle determination unit 103 may determine whether an obstacle detected by the clearance sonars 201a to 201d is an obstacle intended for driving assistance on the basis of the target distance received from the clearance sonar ECU 20. For example, each of pieces of obstacle information, detected by the clearance sonars 201a to 201d, may be generated because of the presence of an object that cannot be an obstacle (such as snow adhered to any one of the clearance sonars 201a to 201d). Therefore, it is determined whether the obstacle information detected by the clearance sonars 201a to 201d indicates an obstacle intended for driving assistance (obstacle determination). A specific obstacle determination method will be described later.

The control amount computing unit 104 computes a control amount in driving assistance. For example, when the obstacle determination unit 103 has determined that the host vehicle collides with the obstacle, the control amount computing unit 104 may compute a required braking force based on the above-described required deceleration. The control amount computing unit 104 may compute a required driving force for suppressing driving force to a predetermined level when the detected obstacle is located within a predetermined distance D0. The control amount computing unit 104 may compute a required driving force for suppressing driving force to "0" when it has been determined that the host vehicle collides with the detected object.

The control amount computing unit 104 returns the host vehicle from a state where collision avoidance driving assistance has been carried out. That is, the control amount computing unit 104 computes a control amount for returning from the state where the collision avoidance driving assistance has been carried out. For example, the control amount computing unit 104 may compute a required driving force according to the return mode selected by the above-described obstacle determination unit 103.

The HMI computing unit 105 is a computing unit for outputting various pieces of information for reminding the driver of the obstacle when an intended obstacle is detected. The HMI computing unit 105, for example, carries out computation for providing notification by a display device, an audio device, a vibration device, or the like (not shown), to the driver through the meter computer 50.

The output processing unit 106, for example, converts computed results to signals conforming with the CAN communication standard and outputs the signals in order to transmit the control amounts (the required driving force and the required braking force) computed by the control amount computing unit 104 and the computed result (output information) computed by the HMI computing unit 105 to the engine ECU 60, the brake ECU 70 and the meter computer 50.

Next, a driving assistance flowchart that is executed by the driving assistance apparatus 1 according to the present embodiment, that is, particularly, a flowchart that carries out driving assistance for avoiding a collision, including intervening to suppress the driving force, and then returning the suppressed driving force, will be described.

Figure 2:
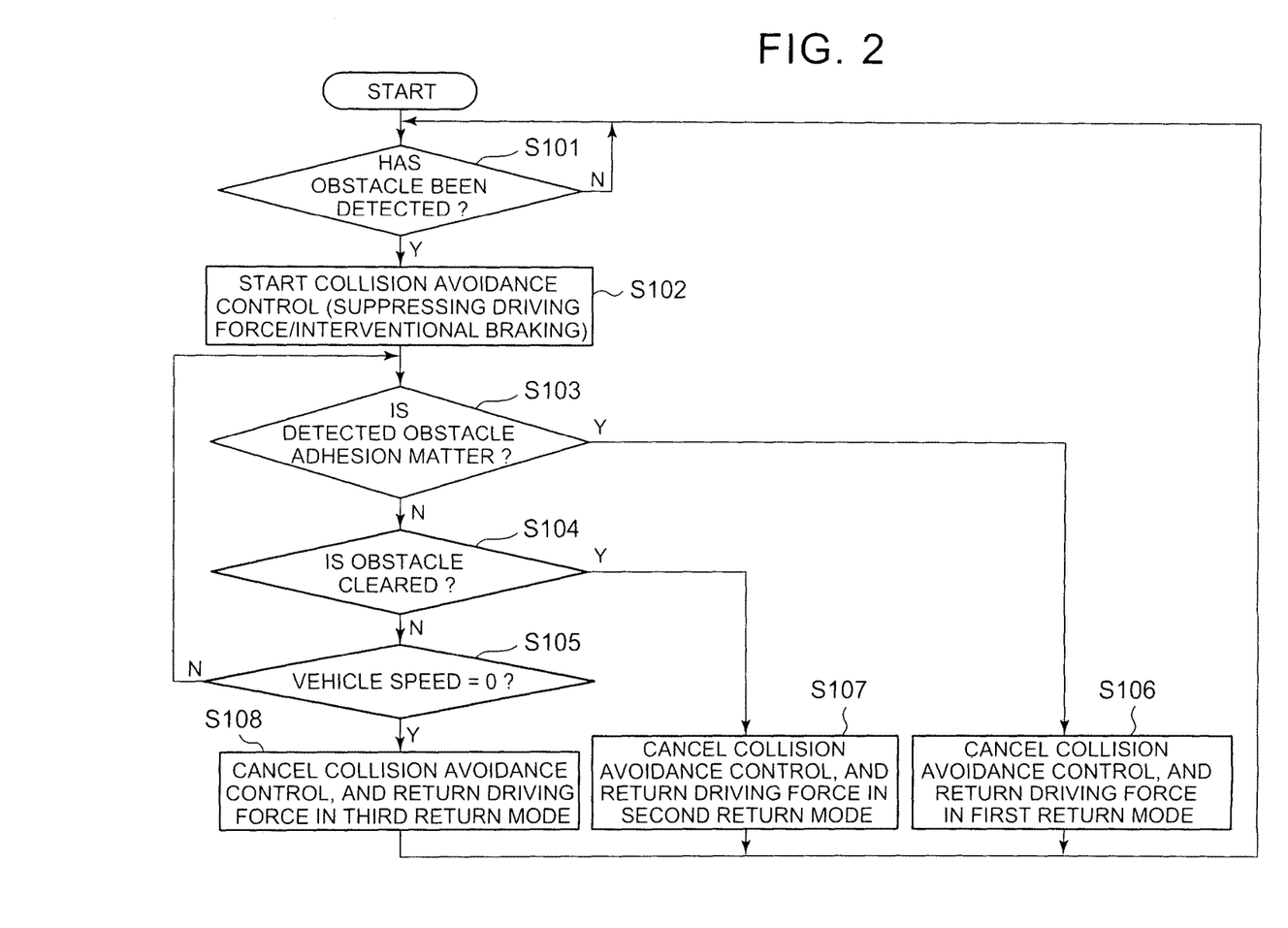
FIG. 2 is a flowchart that illustrates the operation of the driving assistance apparatus according to a first embodiment.

FIG. 2 is a flowchart that illustrates the operation of the driving assistance apparatus 1. The routine shown in FIG. 2 may be started from when the ignition of the vehicle on which the driving assistance apparatus 1 is mounted is turned on and may be executed while the ignition is on. The driving assistance that is carried out by the driving assistance apparatus 1 is allowed to be cancelled by the driver. When the cancellation operation is conducted by the driver, the routine shown in FIG. 2 may be ended. The driving assistance that is carried out by the driving assistance apparatus 1 may be started by the driver through starting operation. In this case, the routine shown in FIG. 2 may be started through the starting operation.

In step S101, the driving assistance ECU 10 (obstacle determination unit 103) determines whether an obstacle has been detected by the clearance sonars 201a to 201d. When the obstacle has been detected, the process proceeds to step S102. When no obstacle has been detected, determination as to step S101 is repeated until an obstacle has been detected. In step S101, the obstacle may be detected, and it may be determined that, a distance from the obstacle is shorter than or equal to a predetermined distance (the host vehicle is close to the obstacle to some extent).

In step S102, the driving assistance ECU 10 (control amount computing unit 104) starts collision avoidance control (collision avoidance driving assistance). Specifically, driving force suppression control for intervening to suppress the driving force and interventional braking control for intervening to generate the braking force are started. Interventional braking control and driving force suppression control may be started at the same time, for example, at the timing at which an obstacle has been detected, or driving force suppression control may be started at the timing at which an obstacle has been detected and then interventional braking control may be started at the timing at which it has been determined that there is a high possibility of a collision with the obstacle.

Steps from step S103 express a determination as to whether to end collision avoidance control started in step S102 and a selection of the return mode for returning the suppressed driving force when collision avoidance control is ended. In the present embodiment, a factor for ending collision avoidance driving assistance is used as an index of a possibility that there is an obstacle around the host vehicle, and the return mode for returning the suppressed driving force is selected on the basis of the factor. Hereinafter, it is determined whether it falls under any one of "the case where the detected obstacle is adhesion matter", "the case where the detected obstacle is cleared" and "the case where the host vehicle has stopped through driving assistance" as a factor for ending collision avoidance driving assistance, and the suppressed driving force is returned on the basis of the determinations.

In step S103, the driving assistance ECU 10 (obstacle determination unit 103) determines whether the detected obstacle is adhesion matter, such as snow, adhered to any one of the clearance sonars 201a to 201d. The clearance sonars 201a to 201d are mostly provided outside the vehicle, and snow, or the like, may adhere to the clearance sonars 201a to 201d. Therefore, any one of the clearance sonars 201a to 201d detects the adhesion matter, such as snow, as an obstacle, and collision avoidance driving assistance may be started. Thus, when it is determined in this step that the detected obstacle is adhesion matter, the process proceeds to step S106, the collision avoidance driving assistance is ended, and the suppressed driving force is returned. Thus, the collision avoidance driving assistance started although there is no obstacle from a collision should be avoided is ended, and the suppressed driving force is also returned, so it is possible to reduce a feeling of strangeness experienced by the driver. When it is determined that the detected obstacle is not adhesion matter, the process proceeds to step S104.

Figure 3:
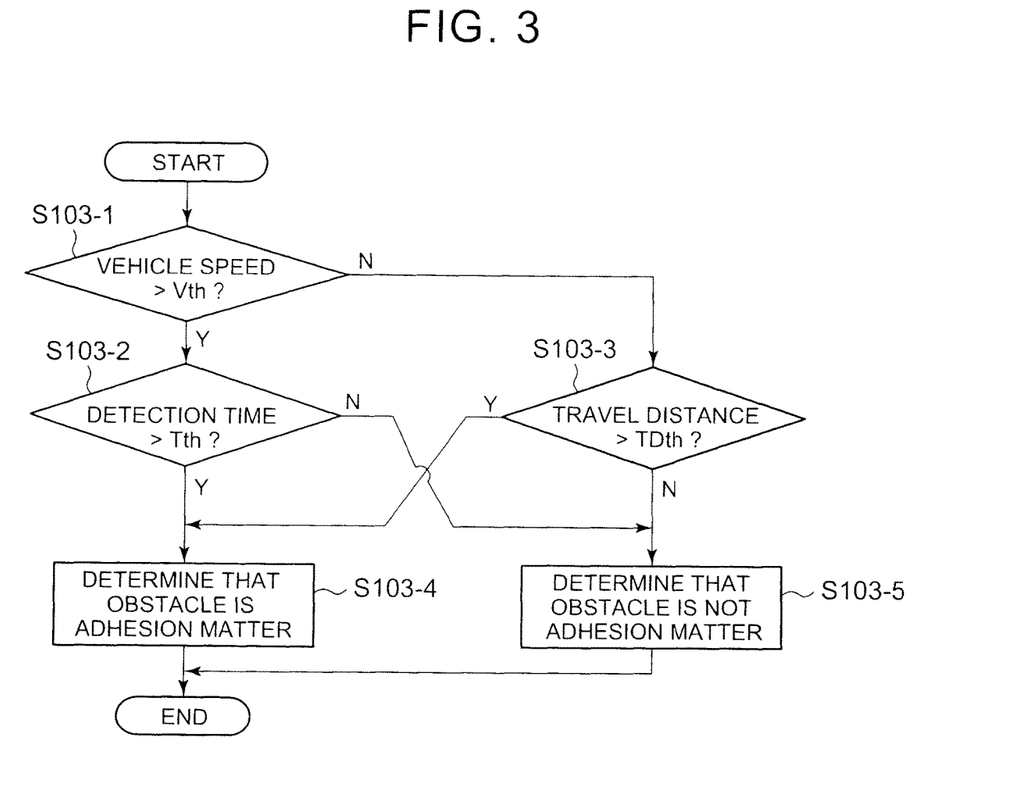
FIG. 3 is a flowchart that illustrates an example of a method of determining whether an obstacle detected by any one of clearance sonars is adhesion matter.

An example of a method of determining whether the detected obstacle is adhesion matter adhered to any one of the clearance sonars 201a to 201d will be simply described.

FIG. 3 is a flowchart that illustrates an example of a method of determining whether an obstacle detected by any one of the clearance sonars 201a to 201d is adhesion matter. The processing flowchart shown in FIG. 3 may be executed independently of distance information regarding each of the clearance sonars 201a to 201d. Hereinafter, a process that is executed on the distance information regarding the clearance sonar 201a will be described as an example.

In step S103-1, the driving assistance ECU 10 (obstacle determination unit 103) determines whether the speed of the host vehicle is higher than a predetermined speed Vth on the basis of the wheel speed information input from the brake ECU 70. When the speed of the host vehicle is higher than the predetermined speed Vth, the process proceeds to step S103-2. When the speed of the host vehicle is lower than or equal to the predetermined speed Vth, the process proceeds to step S103-3.

Step S103-2 or step S103-3 is a step of determining whether the obstacle detected by the clearance sonar 201a is adhesion matter, such as snow.

In step S103-2, the driving assistance ECU 10 (obstacle determination unit 103) determines whether a time (detection time) during which the obstacle detected by the clearance sonar 201a has been continuously detected exceeds a predetermined time T1th. When the obstacle has been continuously detected for a certain time (predetermined time T1th) from when the obstacle has been detected, because the host vehicle has been continuously able to travel without a collision with the close-range obstacle, it may be determined that the detected object is adhesion matter.

Thus, in step S103-2, when the detection time is longer than the predetermined time T1th, the process proceeds to step S103-4, and it is determined that the obstacle detected by the clearance sonar 201a is adhesion matter. When the detection time is shorter than or equal to the predetermined time T1th, the process proceeds to step S103-5, and it is determined that the obstacle detected by the clearance sonar 201a is not adhesion matter.

In step S103-3, the driving assistance ECU 10 (obstacle determination unit 103) determines whether a distance (travel distance) that the host vehicle has travelled in a state where the obstacle detected by the clearance sonar 201a has been continuously detected exceeds a predetermined distance TD1th. When the host vehicle has travelled a certain distance (predetermined distance TD1th) in a state where an obstacle has been continuously detected since the obstacle is detected, because the host vehicle has been continuously able to travel without a collision with the close-range obstacle, it may be determined that the detected object is adhesion matter.

Thus, when the travel distance exceeds the predetermined distance TD1th by using the clearance sonar 201a in step S103-3, the process proceeds to step S103-4, and it, is determined that the obstacle detected by the clearance sonar 201a is adhesion matter. When the travel distance is shorter than or equal to the predetermined distance TD1th by using the clearance sonar 201a, the process proceeds to step S103-5, and it is determined that the obstacle detected by the clearance sonar 201a is not adhesion matter. The predetermined distance TD may be a distance to an obstacle at the time when the clearance sonar 201a starts detecting the obstacle.

In this way, by changing a determination condition as to whether it is adhesion matter on the basis of a vehicle speed, it is possible to prevent erroneous determination in the case where it is determined whether it is adhesion matter on the basis of the travel distance of the host vehicle when the vehicle speed is high to some extent. That is, when the vehicle speed is high to some extent, the travel distance within one cycle of each of the clearance sonars 201a to 201d is long, so, for example, even when rain is detected only in a certain cycle, the travel distance of the host vehicle can exceed the predetermined distance TD1th during the cycle. Therefore, rain detected only in a certain cycle can be determined as adhesion matter. In contrast, when the vehicle speed is high (when the vehicle speed is higher than the predetermined speed Vth), it is possible to prevent the above-described erroneous determination by determining whether it is adhesion matter on the basis of a detection time. If it is determined whether it is adhesion matter on the basis of the travel distance of the host vehicle irrespective of the vehicle speed, it is required to increase the predetermined distance TD1th in coordination with the case where the vehicle speed is high for the purpose of preventing the above-described erroneous determination. As a result, there occurs an inconvenience that a time required until it is determined whether the detected object is adhesion matter extends when the vehicle speed is low to some extent. However, by changing the condition for determining whether the detected object is adhesion matter between the case where the vehicle speed is high and the case where the vehicle speed is low, the above-descried inconvenience does not occur. That is, when the vehicle speed is low to some extent, it is possible to early determine whether the detected object is adhesion matter.

The above-described determination method is one example, and any method may be used in determining whether it is adhesion matter in the present embodiment.

Referring back to FIG. 2, in step S104, the driving assistance ECU 10 (obstacle determination unit 103) determines whether the detected obstacle is cleared. The fact that the obstacle is cleared is that no obstacle is detected anymore by any one of the clearance sonars 201a to 201d. This may also include the case where it is determined that the obstacle is avoidable by driver's steering operation. When no obstacle is detected anymore, an object intended for driving assistance has disappeared, so the collision avoidance driving assistance may be ended. When it may be determined that the obstacle is avoidable by the driver, it may be better not carrying out collision avoidance driving assistance but avoiding a collision by driver's operation. Thus, when it is determined in this step that the detected obstacle is cleared, the process proceeds to step S107, the collision avoidance driving assistance is ended, and the suppressed driving force is returned. When it is determined that the detected obstacle is not cleared, the process proceeds to step S105.

In step S105, the driving assistance ECU 10 (obstacle determination unit 103) determines whether the vehicle speed is 0, that is, whether the host vehicle has stopped for avoiding a collision, on the basis of the wheel speed information, and the like, transmitted from the brake ECU 70. For example, when the host vehicle has stopped by the braking force based on driving force suppression control and interventional braking control, it is desirable to end driving assistance for safety. This also applies to the case where the host vehicle has stopped through driver's deceleration operation in a state where the driving force has been suppressed through driving force suppression control. Thus, for example, when the host vehicle stops in a railroad crossing, a crossing bar moves down and the crossing bar is recognized as an obstacle, it is possible to cause the host vehicle to start moving on the basis of driver's intention because the collision avoidance driving assistance has been ended. Thus, when it is determined in this step that the vehicle speed is 0 and the driver is carrying out accelerator operation (when the driver has an intention to start moving the host vehicle), the process proceeds to step S108, the collision avoidance driving assistance is ended and the suppressed driving force' is returned. When it is determined that the vehicle speed does not become 0, the process returns to step S103.

As described above, it is determined in step S103 to step S105 whether it falls under the case where the collision avoidance driving assistance is ended, and then, when it falls under the case, driving assistance is ended, and the suppressed driving force is returned. When it is determined in step S103 to step S105 that it does not fall under the case where the collision avoidance driving assistance is ended, the determinations of step S103 to step S105 are repeated until it falls under any one of the cases, and the collision avoidance driving assistance is continuously executed. Step S103 to step S105 may be executed in parallel with each other.

When it is determined in step S103 that the detected obstacle is adhesion matter, the driving assistance ECU 10 (obstacle determination unit 103, control amount computing unit 104) ends the collision avoidance driving assistance, and returns the driving force in the first return mode in step S106.

When it is determined in step S104 that the detected obstacle is cleared, the driving assistance ECU 10 (obstacle determination unit 103, control amount computing unit 104) ends the collision avoidance driving assistance and returns the driving force in the second return mode in step S107.

When it is determined in step S105 that the vehicle speed is 0 and the driver is carrying out accelerator operation, the driving assistance ECU 10 (obstacle determination unit 103, control amount computing unit 104) ends the collision avoidance driving assistance and returns the driving force in the third return mode in step S108.

The return modes for returning the suppressed driving force will be described. In the present embodiment, the driving assistance ECU 10 selects one return mode selected from among the plurality of return modes at the time of returning the suppressed driving force. Specifically, the driving assistance ECU 10 has the three return modes (the first return mode, the second return mode and the third return mode). As will be described below, each return mode is defined as a temporal change in driving force for a certain accelerator opening degree, and is set such that a level to which the driving force is returned, a time taken until completion of the return, a rate of increase at the time of the return, or the like, is different. That is, the return modes are set such that the driving force corresponding to a certain accelerator opening degree is different among the return modes.

Figure 4A:
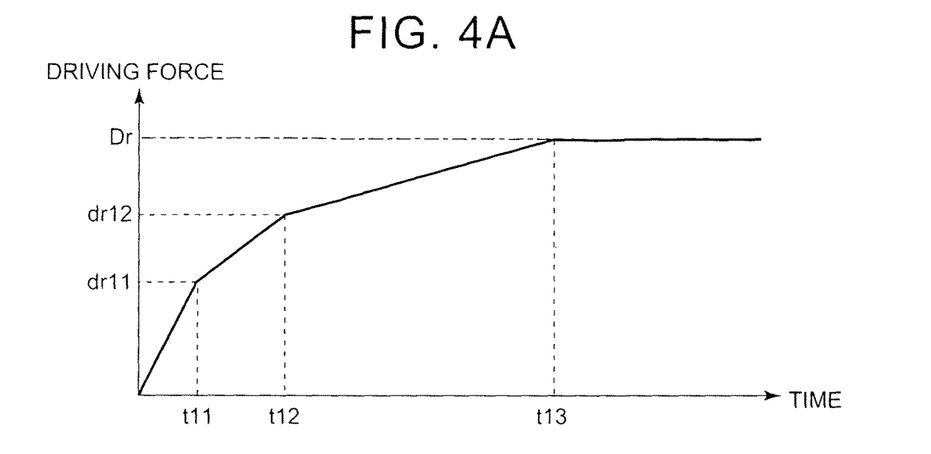
FIG. 4A is a time chart that illustrates a first return mode in which the driving assistance apparatus returns a suppressed driving force.
Figure 4B:
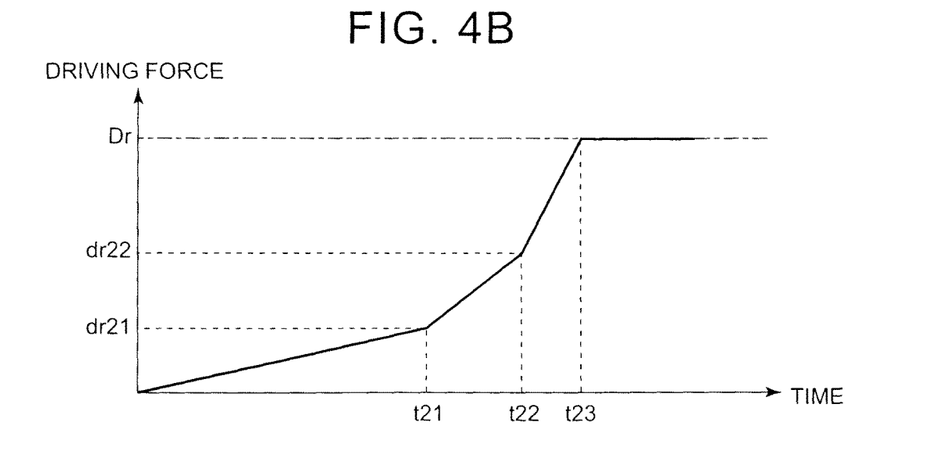
FIG. 4B is a time chart that illustrates a second return mode in which the driving assistance apparatus returns a suppressed driving force.
Figure 4C:
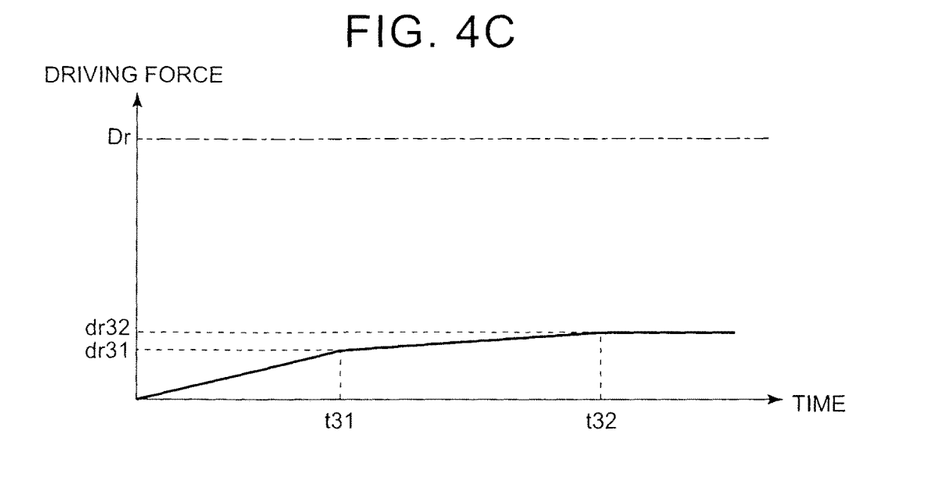
FIG. 4C is a time chart that illustrates a third return mode in which the driving assistance apparatus returns a suppressed driving force.

FIG. 4A to FIG. 4C are graphs that show examples of the return mode. FIG. 4A is a graph that shows the first return mode. FIG. 4B is a graph that shows the second return mode. FIG. 4C is a graph that shows the third return mode. FIG. 4A to FIG. 4C each show a temporal change in driving force for an accelerator opening degree (the same accelerator opening degree in each return mode) where the ordinate axis represents driving force and the abscissa axis represents time. In each graph, the time at which a return of the suppressed driving force is started is set to 0. In each graph, the driving force Dr indicates a driving force corresponding to an accelerator opening degree during normal times. The phrase "during normal times" indicates a state where no driving assistance, such as intervening to suppress driving force, is carried out. Each return mode is defined as a return mode from the state where the driving force is suppressed to 0; instead, a return mode from a state where the driving force is suppressed to a value not 0 may also be similarly defined.

As shown in FIG. 4A, in the first return mode, the driving force is returned at a constant rate of increase from 0 (suppressed driving force) to a driving force dr11 in the period from time 0 to time W. The driving force dr11 is about half of Dr. The driving force is returned at a constant rate of increase from dr11 to a driving force dr12 in the period from time t11 to time t12. The driving force dr12 is about two thirds of Dr. At this time, the rate of increase is set so as to be lower than the rate of increase in the period from time 0 to time t11. The driving force is returned at a constant rate of increase from dr12 to Dr (driving force corresponding to the accelerator opening degree during normal times) in the period from time t12 to time 13. At this time, the rate of increase is set so as to be lower than the rate of increase in the period from time t11 to time t12. In this way, a return of the driving force is started at a predetermined rate of increase, and the driving force is returned to the driving force corresponding to the accelerator opening degree during normal times while the rate of increase in driving force becomes lower (is reduced) with a lapse of time. In this example, the rate of increase in driving force is set so as to be reduced in three stages with a lapse of time; instead, the rate of increase may be set in further separated stages. The rate of increase in driving force may be continuously reduced with a lapse of time.

When it is determined that there is a low possibility that there is an obstacle around the host vehicle, it is not problematic that the driving force is increased at a higher rate to some extent. By increasing the driving force at a higher rate to some extent in the initial stage of the return, it is possible to reflect driver's intention of early accelerating the host vehicle in the case of no obstacle around the host vehicle. Thus, when it is determined that there is a low possibility that there is an obstacle around the host vehicle, the first return mode may be selected.

When the detected obstacle is adhesion matter adhered to any one of the clearance sonars 201a to 201d, it is determined that there is a low possibility that there is an obstacle around the host vehicle. Thus, because it is not problematic that the driving force is increased at a higher rate to some extent, the first return mode is selected.

Subsequently, as shown in FIG. 4B, in the second return mode, the driving force is returned at a constant rate of increase from 0 (suppressed driving force) to a driving force dr21 in the period from time 0 to time t21. The driving force dr21 is about a quarter of Dr. At this time, the rate of increase is set so as to be lower than the rate of increase in the period from time 0 to time t11 (the initial stage of the return) in the first return mode. A time from time 0 to time t21 is longer than a time from time 0 to time t12 in the first return mode shown in FIG. 4A. The driving force is returned at a constant rate of increase from dr21 to a driving force dr22 in the period from time t21 to time t22. The driving force dr22 is about half of Dr. At this time, the rate of increase is set so as to be higher than the rate of increase in the period from time 0 to time t21. The driving force is returned at a constant rate of increase from dr22 to Dr (driving force corresponding to the accelerator opening degree during normal times) in the period from time t22 to time 23. At this time, the rate of increase is set so as to be higher than the rate of increase in the period from time t21 to time t22. In this way, the return of the driving force is started at a rate of increase lower than the rate of increase in the driving force in the initial stage of the return (in the period from time 0 to time t11) in the first return mode, and the driving force is returned to the driving force corresponding to the accelerator opening degree during normal times while the rate of increase in driving force is increased with a lapse of time. In this example, the rate of increase in driving force is set so as to be increased in three stages with a lapse of time; instead, the rate of increase may be set in further separated stages. The rate of increase in driving force may be continuously increased with a lapse of time.

When it is determined that there is an intermediate possibility that there is an obstacle around the host vehicle, it is possible to ensure safety for re-acceleration by starting to increase the driving force at a lower rate. After a lapse of a certain time from the start of return of the driving force, because the host vehicle has been able to travel without a collision with an obstacle, it is possible to reflect driver's intention of early accelerating the host vehicle by quickly returning the driving force while increasing the rate of increase in driving force with a lapse of time. Thus, when it is determined that there is an intermediate possibility that there is an obstacle around the host vehicle, the second return mode may be selected.

When the detected obstacle is cleared, there is no obstacle in a close range because the cleared obstacle falls outside the detection range of each of the clearance sonars 201a to 201d; however, there is a possibility that the cleared obstacle, enters the detection range again, so it is determined that there is an intermediate possibility that there is an obstacle around the host vehicle. Thus, the second return mode is selected. In the second return mode, while checking safety by starting the return of the driving force at a lower rate, the driving force is returned to the driving force corresponding to the acceleration opening degree during normal times quickly by gradually increasing the rate of increase in driving force for reflecting driver's intention.

Subsequently, as shown in FIG. 4C, in the third return mode, the driving force is returned at a constant rate of increase from 0 (suppressed driving force) to a driving force dr31 in the period from time 0 to time t31. The driving force is about a fifth of Dr. At this time, the rate of increase is set so as to be lower than the rate of increase in the period from time 0 to time t11 (the initial stage of the return) in the first return mode shown in FIG. 4A. A time from time 0 to time t31 is longer than a time from time 0 to time t12 in the first return mode shown in FIG. 4A. The driving force is returned at a constant rate of increase from dr31 to a driving force dr32 in the period from time t31 to time t32. The driving force dr32 is about a quarter of Dr. At this time, the rate of increase is set so as to be lower than the rate of increase in the period from time 0 to time t31. In this way, the return of the driving force is started at a rate of increase lower than the rate of increase in the driving force in the initial stage of the return (in the period from time 0 to time t11) in the first return mode, and the driving force is returned to a suppressed driving force (dr32) that is smaller than the driving force corresponding to the accelerator opening degree during normal times while the rate of increase in driving force is reduced with a lapse of time. In this example, the rate of increase in driving force is set so as to be reduced in two stages with a lapse of time; instead, the rate of increase may be set in further separated stages. The rate of increase in driving force may be continuously reduced with a lapse of time.

When it is determined that there is a high possibility that there is an obstacle around the host vehicle, by limiting the driving force to a limited driving force smaller than the driving force corresponding to the accelerator opening degree during normal times, it is possible to prevent rushing to an obstacle, for example, when the driver erroneously depresses the pedal. By returning the driving force to at least the limited driving force, it is possible to cause the host vehicle to start moving on the basis of a driver's intention, for example, when the host vehicle stops inside a railroad crossing and a crossing bar moves down and then the crossing bar is recognized as an obstacle. Thus, when it is determined that there is a high possibility that there is an obstacle around the host vehicle, the third return mode may be selected.

When the speed of the host vehicle is 0, that is, when the host vehicle has stopped for avoiding a collision, it is determined that there is a high possibility that an obstacle is still present in a close range. Thus, the third return mode is selected. In the third return mode, the return of the driving force is started at a lower rate, and the returned driving force is also limited to the limited driving force smaller than the driving force corresponding to the accelerator opening degree during normal times.

Referring back to FIG. 2, after the return driving assistance is carried out in any one of step S106 to step S108, the process returns to step S101 again and an obstacle is detected, that is, the process returns to a state of monitoring an obstacle.

When the driving force is returned in the third return mode in step S108, for example, the host vehicle may be cause to travel a predetermined distance or a predetermined time in a state where the driving force is limited to the limited driving force, the limitation may be cancelled, and then the driving force may be returned to a driving force corresponding to accelerator operation during normal times. The driver may be informed of the fact that the driving force is returned in the third return mode (via the meter computer 50, or the like), the driver may cancel the return in the third return mode through a cancellation operating unit (not shown), and then the driving force may be returned to the driving force corresponding to the accelerator operation during normal times.

In this way, when the suppressed driving force is returned, the plurality of return modes are set, and the driving force is returned in accordance with a selected one return mode on the basis of a possibility that there is an obstacle around the host vehicle. Thus, it is possible to keep balance between ensuring safety and reflecting driver's intention of quickly accelerating the host vehicle.

Particularly, the possibility that there is an obstacle around the host vehicle depends on each of the factors for returning the suppressed driving force ("the case where the detected obstacle is adhesion matter", "the case where the detected obstacle is cleared" and "the case where the host vehicle has stopped through driving assistance"). Thus, by selecting a different return mode for each of these factors, specifically, it is possible to keep balance between ensuring safety and reflecting driver's intention of quickly accelerating the host vehicle.

Second Embodiment

Next, a second embodiment will be described.

The present embodiment mainly differs from the first embodiment in that a distance to an obstacle that has been detected just before is used as an index of the possibility that there is an obstacle around the host vehicle. Hereinafter, like reference numerals denote similar component elements to those of the first embodiment, and the difference will be mainly described.

The system configuration of the driving assistance apparatus 1 according to the present embodiment is shown in FIG. 1 as in the case of the first embodiment, so the description thereof is omitted.

Next, a driving assistance flowchart that is executed by the driving assistance apparatus 1 according to the present embodiment, that is, particularly, a flowchart that carries out driving assistance for avoiding a collision, including intervening to suppress the driving force, and then returning the suppressed driving force, will be described.

Figure 5:
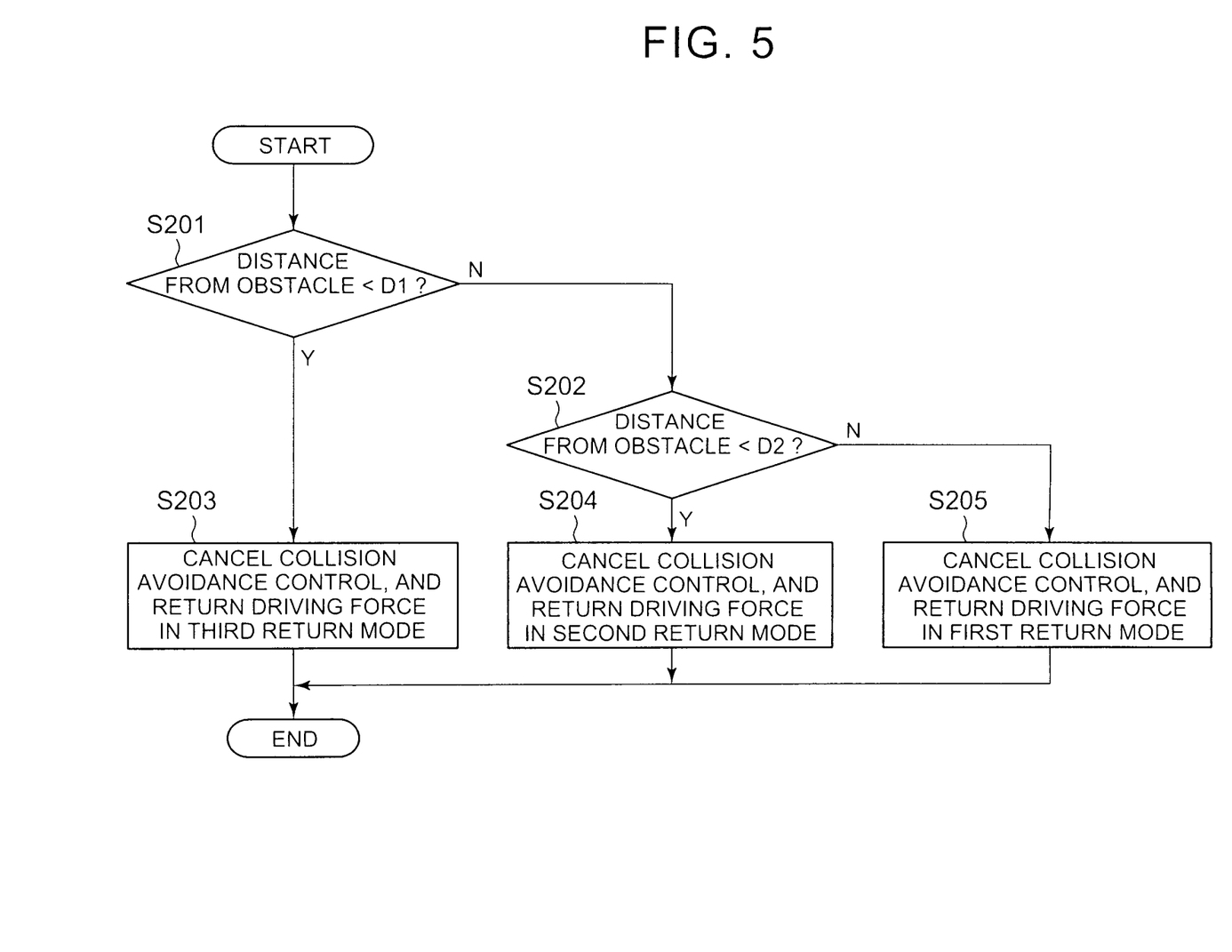
FIG. 5 is a flowchart that illustrates the operation of a driving assistance apparatus according to a second embodiment.

FIG. 5 is a flowchart that illustrates the operation of the driving assistance apparatus 1. This flowchart, different from that of the first embodiment, shows only a portion for selecting the return mode. That is, the return mode may be selected in accordance with this flowchart when it falls under any one of the factors for ending the collision avoidance driving assistance ("the case where the detected obstacle is adhesion matter", "the case where the detected obstacle is cleared", and the like). The return modes, as in the case of the first embodiment, include the first return mode, the second return mode and the third return mode, and are respectively shown in FIG. 4A to FIG. 4C.

In step S201, the driving assistance ECU 10 (obstacle determination unit 103) determines whether the distance from the obstacle that has been detected just before is shorter than a predetermined distance D1. When the distance from the obstacle that has been detected just before is shorter than the predetermined distance D1, the process proceeds to step S203. In step S203, the driving assistance ECU 10 (control amount computing unit 104) ends the collision avoidance driving assistance, and returns the suppressed driving force in the third return mode. The phrase "just before" means the timing after the collision avoidance driving assistance is ended and just before the return of the suppressed driving force is started. For example, when the collision avoidance driving assistance is ended as a result of the fact that the obstacle is cleared and then the suppressed driving force is returned, it is the timing just before the obstacle is cleared.

In step S201, when the distance from the obstacle that has been detected just before is longer than or equal to the predetermined distance D1, the process proceeds to step S202.

In step S202, the driving assistance ECU 10 (obstacle determination unit 103) determines whether the distance from the obstacle that has been detected just before is shorter than a predetermined distance D2 (>D1). When the distance from the obstacle that has been detected just before is shorter than the predetermined distance D2, the process proceeds to step S204. In step S204, the driving assistance ECU 10 (control amount computing unit 104) ends the collision avoidance driving assistance, and returns the suppressed driving force in the second return mode.

In step S202, when the distance from the obstacle that has been detected just before is longer than or equal to the predetermined distance D2, the process proceeds to step S205. In step S205, the driving assistance ECU 10 (control amount computing unit 104) ends the collision avoidance driving assistance, and returns the suppressed driving force in the first return mode.

That is, in this example, the return mode is selected on the basis of the distance from the obstacle that has been detected just before. Specifically, when the distance from the obstacle that has been detected just before is longer than or equal to D2, the suppressed driving force is returned in the first return mode. When the distance from the obstacle that has been detected just before is shorter than D2 and longer than or equal to D1, the suppressed driving force is returned in the second return mode. When the distance from the obstacle that has been detected just before is shorter than D1, the suppressed driving force is returned in the third return mode.

It is determined that there is a relatively high possibility that there is an obstacle around the host vehicle as the distance from the obstacle that has been detected just before is shorter, and it is determined that there is a relatively low possibility that there is an obstacle around the host vehicle as the distance from the obstacle that has been detected just before is longer. Thus, as described above, as the distance from the obstacle that has been detected just before decreases, the return mode for returning the suppressed driving force is selected in order of the first return mode, the second return mode, and the third return mode. Thus, it is possible to keep balance between ensuring safety and reflecting driver's intention of quickly accelerating the host vehicle. The above-described predetermined distances D1, D2 may be set as needed.

Third Embodiment

Next, a third embodiment will be described.

The present embodiment differs from the first embodiment in that whether a return mode is selected by the driver and a return mode selected by the driver are used as an index of the possibility that there is an obstacle around the host vehicle. Hereinafter, like reference numerals denote similar component elements to those of the first embodiment, and the difference will be mainly described.

The system configuration of the driving assistance apparatus 1 according to the present embodiment is shown in FIG. 1 as in the case of the first embodiment, so the description thereof is omitted.

Next, a driving assistance flowchart that is executed by the driving assistance apparatus 1 according to the present embodiment, that is, particularly, a flowchart that carries out driving assistance for avoiding a collision, including intervening to suppress the driving force, and then returning the suppressed driving force, will be described.

Figure 6:
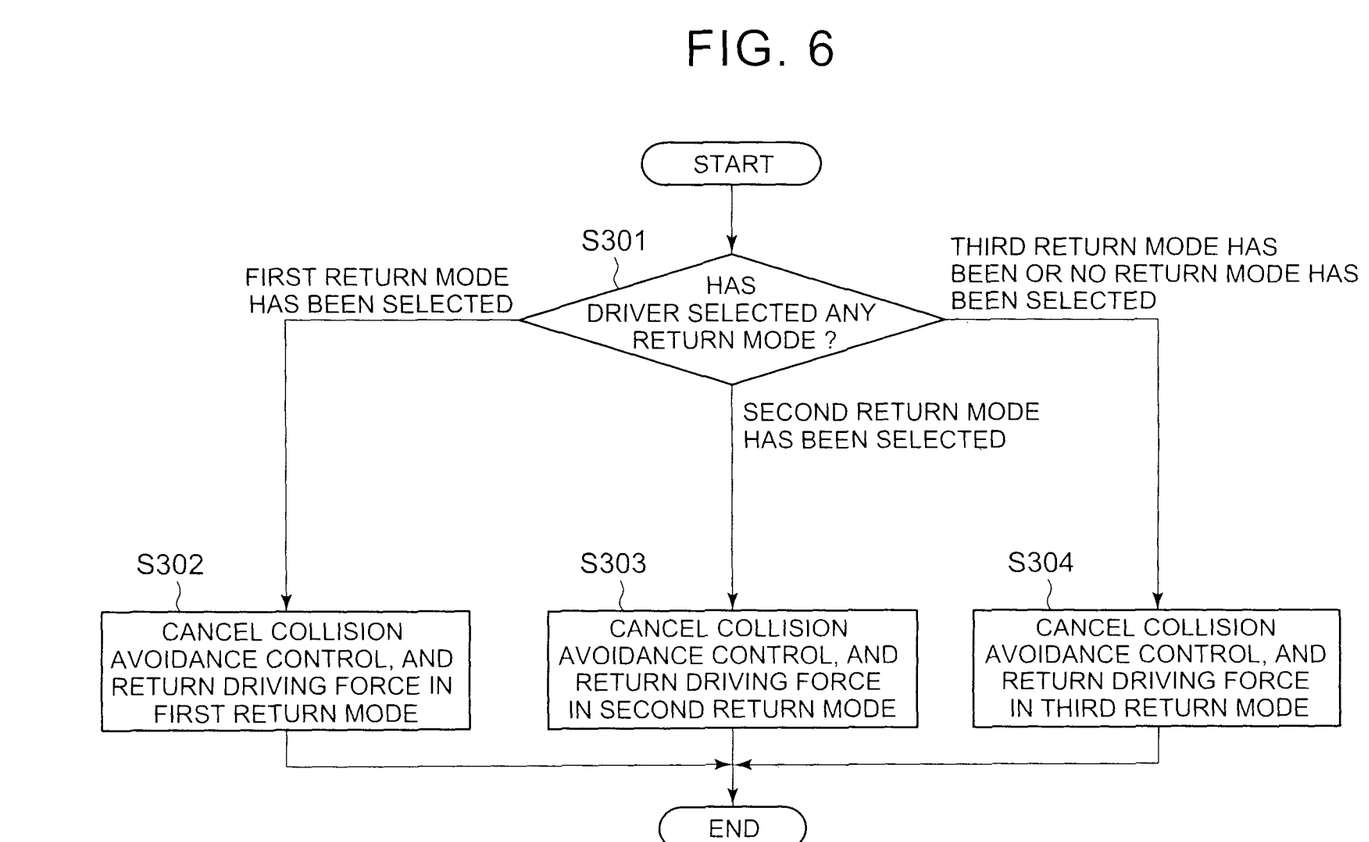
FIG. 6 is a flowchart that illustrates the operation of a driving assistance apparatus according to a third embodiment.

FIG. 6 is a flowchart that illustrates the operation of the driving assistance apparatus 1. This flowchart, different from that of the first embodiment, shows only a portion for selecting the return mode. That is, the return mode may be selected in accordance with this flowchart when it falls under any one of the factors for ending the collision avoidance driving assistance ("the case where the detected obstacle is adhesion matter", "the case where the detected obstacle is cleared", and the like). The return modes, as in the case of the first embodiment, include the first return mode, the second return mode and the third return mode, and are respectively shown in FIG. 4A to FIG. 4C.

In step S301, the driving assistance ECU 10 (HMI computing unit 105) causes, via the meter computer 50, a selected display device that is visually recognizable from a driver seat to show an indication of prompting the driver to select the return mode in which the suppressed driving force is returned. The driving assistance ECU 10 determines whether the return mode has been selected by driver's operation and which return mode has been selected in the case where the return mode has been selected. For example, a display unit of a combination meter instrument (not shown), a display unit of a car navigation system (not shown), or the like, may be used as the display device that shows an indication to prompt the driver to select the return mode. For example, an exclusive operation switch, or the like, may be provided or an indication of selecting the return mode may be shown on a touch panel display as an operation unit for selecting the return mode.

In step S301, when the first return mode is selected by the driver, the process proceeds to step S302, the collision avoidance driving assistance is ended, and the suppressed driving force is returned in the first return mode.

In step S301, when the second return mode is selected by the driver, the process proceeds to step S303, the collision avoidance driving assistance is ended, and the suppressed driving force is returned in the second return mode.

In step S301, when the third return mode is selected by the driver, the process proceeds to step S304, the collision avoidance driving assistance is ended, and the suppressed driving force is returned in the third return mode.

In step S301, when no return mode has been selected by the driver, the process proceeds to step S304, the collision avoidance driving assistance is ended, and the suppressed driving force is returned in the third return mode. The case where no return mode has been selected by the driver means the case where no operation has been carried out for a predetermined time (for example, 10 seconds) since an indication of prompting the driver to select the return mode is shown.

That is, in this example, the return mode is selected on the basis of whether the return mode has been selected by the driver, and the return mode selected by the driver.

When it falls under any one of the factors for ending the collision avoidance driving assistance ("the case where the detected obstacle is cleared", and the like), it is possible to return the suppressed driving force on the basis of driver's intention reflected by allowing the driver to select the return mode. The return mode selected by the driver is a return mode based on driver's determination as to the situation of the host vehicle, so the return mode is selected on the basis of the possibility that there is an, obstacle around the host vehicle. Thus, by returning the suppressed driving force in the return mode selected by the driver, it is also possible to ensure safety. When no operation has been carried out by the driver, it is, for example, in a situation that intervening braking force, or the like, is generated in the host vehicle by the collision avoidance driving assistance, and the driver has no time to carry out such operation or no time to make a determination. In this case, there is a high possibility that there is an obstacle around the host vehicle, so the suppressed driving force is returned in the third return mode in which the returned driving force is limited. Thus, it is possible to ensure safety.

The embodiments of the invention are described in detail above; however, the invention is not limited to those specific embodiments, and may be modified or changed in various forms within the scope of the invention recited in the appended claims.

For example, in the above-described embodiments, the number of the return modes set for returning the suppressed driving force is three; instead, it may be two or four or more.

In the above-described embodiments, another index may be used as the index of the possibility that there is an obstacle around the host vehicle. For example, the type of road, traffic congestion information, such as Vehicle Information Communication System (VICS: trademark), or the like, may be used as an index of a traffic flow on a road.

In the above-described embodiments, the rate of increase in driving force in each of the return modes (the first return mode, the second return mode, and the third return mode), a time required for the driving force to reach a predetermined level, and the like, may be changed on the basis of another condition. For example, when the first return mode is selected, the rate of increase in driving force, a time taken until completion of a return to the driving force corresponding to accelerator operation during normal times, or the like, may be changed on the basis of a vehicle speed, a distance to an obstacle that has been detected just before, or the like.

In the above-described embodiments, a combination of the indices of the possibility that there is an obstacle around the host vehicle (the factors for ending the collision avoidance driving assistance, the distance to an obstacle that has been detected just before, whether the return mode has been selected by the driver, and the like) may be used to select the return mode.

In the above-described embodiments, the plurality of return modes are set such that the rate of increase in driving force, the manner of changing the rate of increase with a lapse of time, the level to which the driving force is returned, and the like, are different among the return modes, and then the suppressed driving force is returned in one return mode selected from among the plurality of return modes. Instead, a method in which a plurality of return modes are not set may be used. That is, at the time of returning the suppressed driving force, the rate of increase in driving force, the manner of changing the rate of increase with a lapse of time, the level to which the driving force is returned, and the like, may be adjusted (changed) on the basis of the possibility that there is an obstacle around the host vehicle. The level to which the driving force is returned means that to what level the driving force is returned as an upper limit of the driving force corresponding to the accelerator opening degree during normal times.

For example, in the above-described embodiments, the ultrasonic sensors are used. The invention is also applicable to the case where other means capable of detecting an obstacle (for example, a millimeter wave radar, a laser radar, a stereo camera, or the like). In this case, as in the case of the above-described clearance sonars 201, the number of means arranged for detecting an obstacle is not limited, and an appropriate number of means for detecting an obstacle may be provided so as to be able to detect an obstacle around the host vehicle.

In the above-described embodiments, the clearance sonars 201 are provided outside the vehicle cabin, such as the front bumper, the rear bumper, or the like. Instead, the means for detecting an obstacle may be provided in the vehicle cabin as long as it is possible to detect an obstacle around the host vehicle and detect a distance to the obstacle, or the like. For example, when a stereo camera is used as the means for detecting an obstacle, the stereo camera may be provided near a front windshield, a rear windshield or a side window in the vehicle cabin so as to be able to capture an outdoor image around the host vehicle.

The invention claimed is:

1. A driving assistance apparatus comprising:
an obstacle detector configured to detect an obstacle outside a host vehicle and acquire obstacle information including a distance to the obstacle; and
an electronic control unit configured to execute driving force suppression control for intervening to suppress driving force on the basis of the obstacle information acquired by the obstacle detector and driving force return control for returning the driving force suppressed by the driving force suppression control, the driving force return control configured with a plurality of return modes in which the driving force is returned and, configured to return the driving force in one return mode selected from among the plurality of return modes on a basis of a possibility that there is an obstacle around the host vehicle, wherein
the plurality of return modes include:
(i) a first return mode in which a return of the driving force is started at a predetermined rate of increase and the driving force is returned to a driving force corresponding to an accelerator opening degree during normal times while the rate of increase in the driving force is reduced with a lapse of time,
(ii) a second return mode in which a return of the driving force is started at a rate of increase lower than the predetermined rate of increase and the driving force is returned to the driving force corresponding to the accelerator opening degree during normal while the rate of increase in the driving force is increased with a lapse of time, and
(iii) a third return mode in which the driving force is returned to a limited driving force smaller than the driving force corresponding to the accelerator opening degree during normal times.

2. The driving assistance apparatus according to claim 1, wherein
the return modes included in the plurality of return modes are set such that a driving force corresponding to a certain accelerator opening degree is different among the return modes.

3. The driving assistance apparatus according to claim 1, wherein
the electronic control unit is configured to determine whether the obstacle detected by the obstacle detector is adhesion matter adhered to the obstacle detector, and return the driving force in the first return mode when the adhesion matter determination unit has determined that the detected obstacle is adhesion matter adhered to the obstacle detector.

4. The driving assistance apparatus according to claim 1, wherein
when the obstacle detected by the obstacle detector is not detected anymore in a state where the driving force suppression control is being executed, and when the host vehicle is traveling, the driving force is returned in the second return mode.

5. The driving assistance apparatus according to claim 1, wherein
when the host vehicle has stopped in a state where the driving force suppression control is being executed and when a driver is carrying out accelerator operation, the driving force is returned in the third return mode.

6. The driving assistance apparatus according to claim 5, wherein
the electronic control unit is configured to execute interventional braking control for intervening to generate braking force on the basis of the obstacle information acquired by the obstacle detector, and the case where the host vehicle has stopped is a case where the host vehicle has stopped through the interventional braking control.

7. The driving assistance apparatus according to claim 1, wherein
the electronic control unit is configured to return the driving force in one return mode selected from among the plurality of return modes on the bases of a distance from an obstacle that has been detected by the obstacle detector just before.

8. The driving assistance apparatus according to claim 1, wherein
the driving force is returned in the first return mode when the distance to the obstacle that has been detected is longer than or equal to a first predetermined distance, the driving force is returned in the third return mode when the distance from the obstacle that has been detected is shorter than a second predetermined distance shorter than the first predetermined distance, and the driving force is returned in the second return mode when the distance from the obstacle that has been detected is shorter than the first predetermined distance and longer than or equal to the second predetermined distance.

9. The driving assistance apparatus according to claim 1, further comprising:
a selector configured to allow a driver to select one return mode from among the plurality of return modes when the driving force return control unit returns the driving force, wherein
the electronic control unit is configured to return the driving force in one return mode selected from among the plurality of return modes on the basis of whether the driver has operated the selector and the return mode selected by the driver through the selector at the time when the driver has operated the selector.

10. The driving assistance apparatus according to claim 9, wherein
when the driver has not operated the selector, the return mode for returning the driving force to a limited driving force smaller than the driving force corresponding to the accelerator operation amount during normal times is selected from among the plurality of return modes.

11. A driving assistance apparatus comprising:
an obstacle detector configured to detect an obstacle outside a host vehicle and acquire obstacle information including a distance to the obstacle;
an electronic control unit configured to execute driving force suppression control for suppressing a driving force on the basis of the obstacle information acquired by the obstacle detector and driving force return control for returning the driving force suppressed by the driving force suppression control, and return the driving force by adjusting a rate of increase in the driving force on the basis of a possibility that there is an obstacle around the host vehicle.

12. The driving assistance apparatus according to claim 11, wherein
the electronic control unit is configured to return the driving force to a predetermined driving force, and change the predetermined driving force on the basis of the possibility that there is an obstacle around the host vehicle.

* * * * *

UNITED STATES PATENT AND TRADEMARK OFFICE
CERTIFICATE OF CORRECTION

PATENT NO. : 9,688,274 B2
APPLICATION NO. : 14/913765
DATED : June 27, 2017
INVENTOR(S) : Akihiro Kida et al.

Page 1 of 1

It is certified that error appears in the above-identified patent and that said Letters Patent is hereby corrected as shown below:

On the Title Page

Item (73) should read:
(73) Assignee: TOYOTA JIDOSHA KABUSHIKI KAISHA, Toyota (JP)

Signed and Sealed this
Seventeenth Day of October, 2017

Joseph Matal
*Performing the Functions and Duties of the
Under Secretary of Commerce for Intellectual Property and
Director of the United States Patent and Trademark Office*